Figure 1:
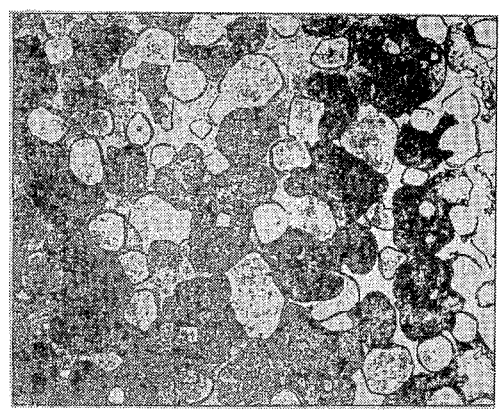

United States Patent Office 3,345,191
Patented Oct. 3, 1967

3,345,191
DOLOMITE SINTER AND A PROCESS OF ITS PRODUCTION
Mihály Brunner, Roslags Nasby, Sweden, assignor to Jernkontoret, The Swedish Ironmasters Association, Stockholm, Sweden
Filed Mar. 22, 1965, Ser. No. 441,537
Claims priority, application Sweden, Mar. 26, 1964, 3,830/64
2 Claims. (Cl. 106—61)

The microstructure of the burnt dolomite used heretofore comprises substantially round periclase-crystals (MgO) in a matrix of lime (CaO). This burnt raw dolomite which usually is called dolomite sinter, was heretofore produced in shaft furnaces or roll-over type furnaces, wherein the dolomite is charged in lumps.

Previously it was generally believed that dolomite sinter had to have the highest possible bulk density for being resistant to slag attacks. No attention was paid in this connection to the role of the microstructure.

The present invention has as its object to produce dolomite sinter with substantially improved slag resistance which is achieved by the combination of a high bulk density with a favourable structure.

The invention is substantially characterized in that raw dolomite as a whole is crushed to a fine powder having a grain size of preferably below 1 mm., and that the crushed raw dolomite is burnt at a temperature between 1200 and 1450° C., preferably between 1300 and 1400° C.

It was found by experiments that the properties of the dolomite sinter, particularly its slag resistance, is improved when the periclase-phase is splintered to small stingy coherent crystals. This finely divided microstructure is obtained by burning the dolomite at a relatively low temperature (1200 to 1450° C.). The dolomite burnt according to conventional methods at such a low temperature shows, however, a bulk density of only about 1.5 g./cm.$^3$. For dolomite sinter to be used as lining material in metallurgical furnaces a bulk density of at least 2.5 g./cm.$^3$ is required. For achieving this value, it was heretofore necessary to increase the temperature to about 1600° C., and for achieving a bulk density of about 3.0 g./cm.$^3$ or higher the temperature had to be increased to between 1800 and 1900° C. The burning, thus, was carried out at a very high temperature in order to obtain the required bulk density which, on the other hand, resulted in a coarsening of the microstructure and in the formation of round separated periclase grains. The present invention renders it possible to burn the dolomite at a temperature which is favourable from a structure point of view, at the same time as a very high bulk density is obtained (exceeding 3.0 g./cm.$^3$).

For most of the dolomite quanlities the most suitable burning temperature according to this invention is about 1400° C. Above 1400° C. there occurs a rapid build-up of the grains while the bulk density increases only insignificantly. The holding time at the peak temperature preferably shall be between one half and twelve hours. The burning is carried out in a suitable furnace equipment, for example in a rotary roll-over type furnace with gas firing.

Pure dolomite (CaCO$_3$·MgCO$_3$) contains 54.35% of CaCO$_3$ and 45.65% of MgCO$_3$. Usually, however, the dolomite is not pure but also contains varying amounts of Fe (mostly in the form of FeCO$_3$), Mn (mostly in the form of MnCO$_3$), Al$_2$O$_3$ and SiO$_2$. It is known that part of the impurities, first of all the Fe-content, is advantageous for obtaining a desired sintering during the burning. When the dolomite does not contain a sufficient content of sintering promoting substances it is, therefore, advisable and suitable to adjust the composition such, that the dolomite subjected to burning contains 0.5 to 5%, preferably 1 to 3% of Fe, counted on the finished product.

The adjusting of the suitable composition is preferably carried out by adding finely ground minerals or mixtures of minerals to the dolomite after or during its crushing. The mixing must be made carefully.

The sintering promoting substance may in certain cases be added in the form of an aqueous solution which brings about a particularly intimate mixture. As an example of such a water-soluble substance may be mentioned ferrous sulphate obtained by the crystallization of waste pickling baths. In present burning methods it is usual to add a certain amount of mill scale to the dolomite lumps which results in a non-uniform sintering product.

According to the invention the dolomite is to be crushed to a fine powder, the finer the powder the better. The grain size must not exceed 1 mm. even if a low percentage of grains of a larger size can be allowed. The crushing required may vary according to the origin of the spatic dolomite and its composition. For achieving the best possible result, the grinding must be driven as far as is economically justifiable.

It is usually suitable to convert the crushed dolomite prior to its burning to moulded bodies, for example by briquetting, pelletizing, extruding or the like, and to burn the moulded bodies. For this agglomeration suitably a binding agent is added, for example water, oil, glycerin, dextrin, MgCl$_2$-solution, CaCl$_2$-solution, emulsions, solid binders or mixtures thereof, etc. A binder of a suitable choice may possibly also replace additions made for promoting the sintering.

In certain cases a conversion of the crushed dolomite to moulded bodies need not be carried out prior to the burning. By sintering fine-grained dolomite, for example, in a fluidized bed agglomeration is effected during the burning operation. The process may in this case be adjusted such, that the dolomite sinter is given a lump size which is directly suitable for the production of lining material, such as bricks, refractory masses and repairing materials.

The invention is illustrated in greater detail in the following reference being had to the accompanying drawings whereof FIG. 1 shows a microphotograph of a dolomite burnt in a shaft furnace.

Figure 2:
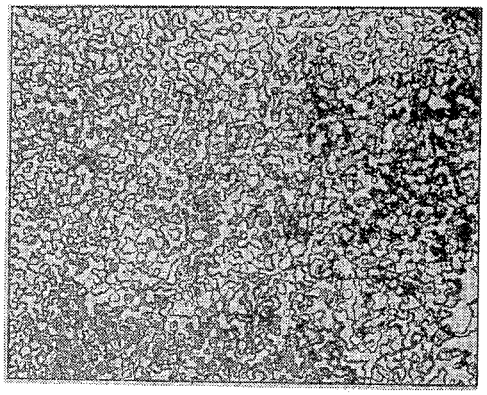
Figure 3:
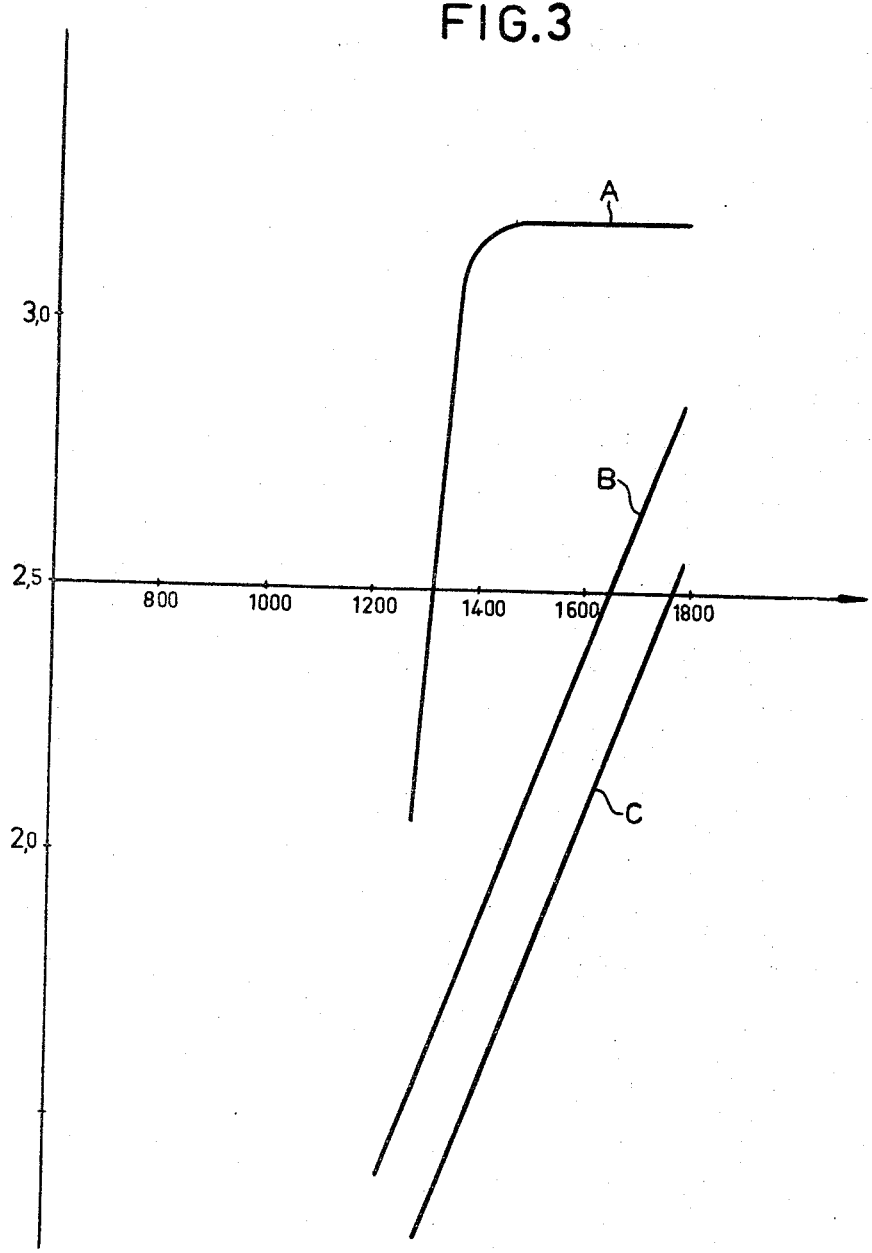

FIG. 2 shows a microphotograph of a dolomite produced according to the invention, and FIG. 3 shows by way of a diagram the relationship between the bulk density and the burning temperature, FIG. 1 shows a microphotograph enlarged 400 times of a structure of a dolomite normally burnt in a shaft furnace. It appears from the microphotograph that large round white grains of periclase (MgO) are embedded in a grey matrix of lime (CaO). The impurities are generally dissolved in the matrix.

FIG. 2 shows a microphotograph enlarged 400 times of the structure of the same dolomite as in FIG. 1 (Larsbo Kalkverk AB) but crushed, agglomerated and burned according to the invention. It appears from the microphotograph that small, stingy, substantially coherent periclase grains are embedded in a darker matrix of lime.

FIG. 3 shows how the bulk density may vary with different burning temperatures. The curve A refers to dolomite which was crushed and burnt according to the invention. In the example shown the burning temperature must not exceed 1400° C. because at higher temperatures the microstructure coarsens and there will be only a minimum gain in bulk density. When the dolomite has a different composition the curve may be displaced laterally somewhat to the right or left.

Curve B and curve C show the variation of the bulk density at different burning temperature when the dolomite is burned in lumps without preceding crushing. The extreme difference to curve A appears clearly without needing comment. Curves A, B and C refer to burning for two hours of a dolomite having substantially the same composition.

For a further illustration of the invention some examples are given below which show both the relation between the sieve analysis of the ground raw dolomite and the bulk density obtained, and the resistance to slag attack.

Example I

Raw dolomite is ground to a sieve analysis according to the table below and burned at 1400° C. for two hours. The result was as follows—

| Fraction mm.: | Bulk density, g./cm.$^3$ |
| --- | --- |
| <0.06 | 3.15 |
| 50%<0.06+50% 0.06–0.079 | 2.77 |
| 50%<0.06+50% 0.075–0.100 | 2.66 |

The finest fraction (<0.06 mm.) had a composition of 62.2% <0.02 mm., the remainder being between 0.02 and 0.06 mm.

Example II

Test bodies of dolomite sinter with different periclase structures were produced whereafter their speed of dissolution in a slag bath was investigated and found to be 18 mg./min. for dolomite sinter with a stingy and coherent periclase structure in accordance with the present invention and 63 mg./min. for a dolomite sinter having a round and non-coherent periclase structure produced according to conventional methods.

What I claim is:

1. A process for producing dolomite sinter adapted for use in the manufacture of linings in metallurgical furnaces which comprises grinding raw dolomite to a grain size of less than 0.06 mm., burning the ground dolomite at a temperature of about 1400° C. to produce a dolomite sinter having a bulk density of about 3.15 g./cm.$^3$ and a structure which is resistive against slag attacks, said structure comprising small crystals forming a stingy substantially coherent periclase crystal phase.

2. A process for producing dolomite sinter adapted for use in the manufacture of linings in metallurgical furnaces which comprises grinding raw dolomite to a grain size of less than 0.06 mm., moulding the ground dolomite to moulded bodies and burning said bodies at a temperature of about 1400° C. to produce a dolomite sinter having a bulk density of about 3.15 g./cm.$^3$ and a structure which is resistive against slag attacks, said structure comprising small crystals forming a stingy substantially coherent periclase crystal phase.

References Cited

UNITED STATES PATENTS

| 1,230,430 | 6,1917 | Patnoe | 106—61 |
| 1,319,056 | 10/1919 | Enright | 106—61 |
| 1,483,468 | 2/1924 | Meyer | 106—61 |

TOBIAS E. LEVOW, *Primary Examiner.*

JAMES E. POER, *Examiner.*